UNITED STATES PATENT OFFICE.

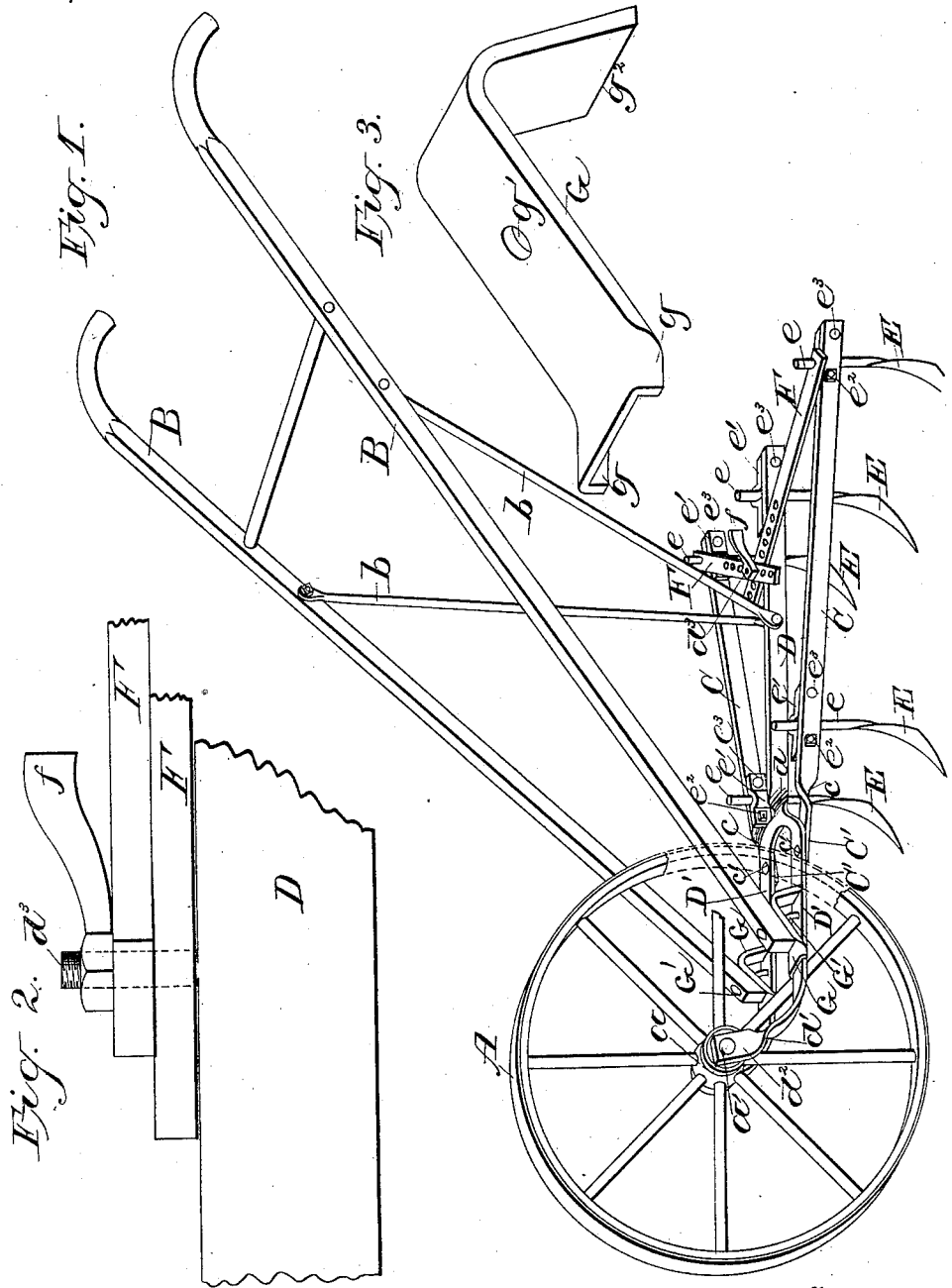

CYRUS ST. JOHN, OF HORICON, WISCONSIN.

CULTIVATOR.

SPECIFICATION forming part of Letters Patent No. 304,578, dated September 2, 1884.

Application filed June 25, 1884. (No model.)

*To all whom it may concern:*

Be it known that I, CYRUS ST. JOHN, of Horicon, in the county of Dodge, and in the State of Wisconsin, have invented certain new and useful Improvements in Cultivators; and I do hereby declare that the following is a full, clear, and exact description thereof.

My invention relates to hand-cultivators; and it consists in certain peculiarities of construction, as will be more fully set forth hereinafter.

In the drawings, Figure 1 is a perspective view of my entire device, and Figs. 2 and 3 are details.

A represents the wheel, and B B the handles, of my cultivator. In the form shown, which is a single-wheel cultivator, I have two outer and one central tooth-beams, (marked C C and D, respectively.) The central tooth-beam (made of wrought-iron, like the outer beams) consists of a strip of iron, which is vertically disposed for about half its length from the rear end, and then is twisted at $d$ to a horizontal position, and thence extends forward in a fork or two branches, D' D', each branch rising at the forward end, and again twisted at right angles at $d'$, as shown, the ends $d^2$ being vertically disposed, or nearly so, and receiving between them the hub $a$ of the wheel, and secured thereto by bolt or axle $a'$. The outer beams, C C, like the central beam, D, are vertically-disposed iron strips from their rear to points opposite the twist $d$ in said central beam, where they, too, are twisted, as shown at $c$ $c$, and thence extend forward a short distance horizontally, as shown at C' C', under the forks D' D' of the central beam, to which they are secured by bolts or rivets $c'$ $c'$.

E E are the cultivator-teeth, having round shanks $e$ $e$, and these are secured to the tooth-beams by means of the metal loops $e'$ $e'$ and securing nuts and rivets $e^2$ and $e^3$, respectively. By means of this adjustment, when it is desired to set the teeth at a different angle, it is only necessary to slightly loosen the nut $e^2$ (the rivet $e^3$ being rigid) of the loop $e'$ of that tooth, and turn the tooth to the required angle, and then again tighten the nut, when the tooth will be firmly held, as before, between the inner side of the beam and the loop. I have shown five teeth in my present drawings; but of course the number used is immaterial; and the shanks $e$ of said teeth being round, they will be held firmly, no matter in what direction their ends point.

The handles B B are secured to the forks D' D' of the central beam, D, by means of the angle-pieces G, (shown in detail in Fig. 3,) as follows: The said pieces G have at their forward ends two downward-depending side flanges, $g$ $g$, which embrace the horizontal portions of the forks D', while the rear ends of said pieces have flat surfaces $g^2$, resting squarely upon the said part D'; and the pieces G are further provided each with a hole, $g'$. The lower or forward ends of the handles B are provided with corresponding holes, as are the forks D' beneath, and when these parts are in the position shown in Fig. 1, a bolt, G', is passed through these holes and a nut screwed tightly on its end, thereby securing all the parts firmly in place on each side of the wheel A. Braces $b$ $b$ extend from the handles down to the rear portion of the beam D, to further strengthen the device. The bolts $c'$ $c'$ are not so tight but that the outer beams may have some play thereon, and the said beams may be adjusted nearer to or farther from the central beam, so as to diminish or increase the width of the device at the rear at pleasure by means of the perforated strips F F, which have each one hole near their outer ends adapted to fit over the shank of the rear tooth on each side, as well as a series of holes near their inner ends adapted to receive a pin, $d^3$, rising from the rear part of the beam D. This pin is screw-threaded, and after the strips F F have been adjusted at the distance required, a handled nut, $f$, is screwed on the pin $d^3$ above said strips, as most clearly shown in the detail view, Fig. 2, thereby preventing accidental detachment of these parts.

Having thus described my invention, what I claim as new, and desire to secure by Letters Patent, is—

1. In a cultivator, the combination of the wheel and handles with the forked and twisted central tooth-beam, D, and the twisted outer tooth-beams, C C, the said beams consisting of strips of wrought-iron vertically disposed in the rear, and twisted so as to lie horizontally in the forward portions, the beam D being forked as well as twisted, and the beams C C being pivoted at their horizontal front ends C' C' to the fork D' D' of the beam D, substantially as set forth.

2. In a cultivator, the combination of the wheel A and tooth-beams C C' and D D' D' with the handles B B, angle-pieces G G, having flanges $g$ $g$, adapted to embrace the forks D' D' of the central tooth-beam, and the screw-bolts G' G', substantially as set forth.

In testimony that I claim the foregoing I have hereunto set my hand, at Horicon, in the county of Dodge and State of Wisconsin, in the presence of two witnesses.

CYRUS ST. JOHN.

Witnesses:
 JOHN WOOD,
 CARL HERKER.